April 13, 1971 M. WISMER ET AL 3,574,646

HEAT RESISTANT MATERIALS

Original Filed April 28, 1961

INVENTORS
MARCO WISMER and
LEONARD D. ROOD
JOSEPH F. BOSSO

BY

ATTORNEYS

United States Patent Office 3,574,646
Patented Apr. 13, 1971

3,574,646
HEAT RESISTANT MATERIALS
Marco Wismer, Gibsonia, Pa., Leonard D. Rood, Silver Spring, Md., and Joseph F. Bosso, Lower Burrell, Pa., assignors to PPG Industries Inc., Pittsburgh, Pa.
Continuation-in-part of application Ser. No. 510,336, Nov. 29, 1965, which is a continuation-in-part of applications Ser. No. 348,229, Feb. 28, 1964, and Ser. No. 438,826, Mar. 3, 1965, both applications 510,336 and 438,826, being continuations-in-part of application Ser. No. 228,475, Oct. 4, 1962, which is a continuation of application Ser. No. 106,291, Apr. 28, 1961. This application Mar. 20, 1968, Ser. No. 714,496
Int. Cl. B28b *21/02;* C04b *21/00, 35/00*
U.S. Cl. 106—41                             27 Claims

ABSTRACT OF THE DISCLOSURE

This invention relates to novel inorganic refractory foams, their precursors and methods of manufacture. The foams are formed by heating a filler, unsaturated polyester foam containing a refractory filler, a fluxing agent which is a compound of a metal of the first and second groups of the Periodic Table and, if desired, a heat resistant fibrous material, thereby consuming the polyester binder to produce the inorganic foam. Alternatively, the binder may be reduced to a carbonaceous state to provide an insulative material useful per se as a precursor for the inorganic foams.

CROSS-REFERENCES TO THE RELATED APPLICATIONS

Figure 1:
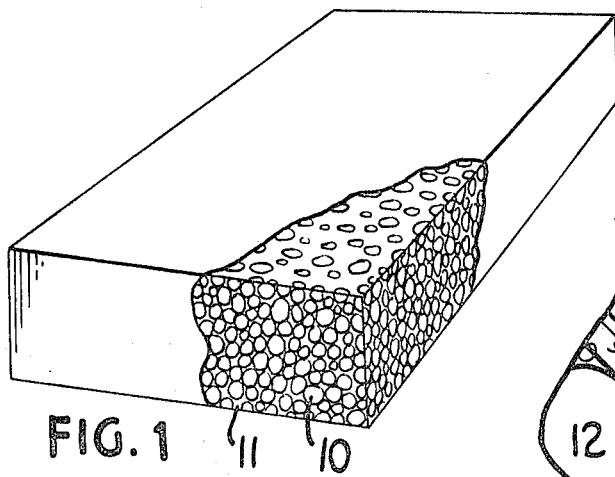

This application is a continuation-in-part of copending application Ser. No. 510,336, filed Nov. 29, 1965 (now abandoned), which in turn is a continuation-in-part of copending application Ser. No. 348,229, filed Feb. 28, 1964 (now abandoned), and 438,826, filed Mar. 3, 1965 (now abandoned); both copending applications 510,336 and 438,826 likewise being continuations-in-part of application Ser. No. 228,475, filed Oct. 4, 1962 (now abandoned), which is a continuation of application Ser. No. 106,291, filed Apr. 28, 1961 (now abandoned).

This invention relates to novel inorganic foams, their precursors, and their method of manufacture, which foams are heat resistant, chemically resistant and have low thermal conductivity and which may be adapted to protect substrates of metal, such as iron, steel, aluminum, or metal alloys, ceramic bodies and the like. The inorganic foams contemplated by this invention can be formed into bricks, slabs or other shapes that can be attached to or supported upon the aforementioned substrates, or which can be used as free or unsupported bodies, for instance, as structural elements in heat resistant walls. Fields of utility include structural steel or aluminum insulation, lining of fire doors, oven doors, mufflers, heat resistant layers in walls of safes and storage vaults, heat shields, or rockets and space capsules, catalyst carriers, filter bodies, and the like.

It has heretofore been recognized that it would often be desirable to provide articles with thermally insulative and/or ablative coatings of cellular materials which would adhere to the surfaces, which could easily be applied, and which would be effective as heat insulation or as a protection against corrosive chemicals even at relatively high temperatures. One field of application of such coatings comprises the covering of walls or the structural steel elements, such as beams, columns or girders, in buildings wherein they may be subjected to high temperatures by reason of accidental fires.

It has heretofore been disclosed to prepare thermally insulative materials by foaming liquid mixtures of thermosetting, polymerizable or interpolymerizable organic materials containing a gas or a gas-producing agent. The so-called polyurethane resins which are produced by the reaction of a polyol and a polyisocyanate, as taught in U.S. Pat. No. 2,602,782 to Simon et al. and many other patents, constitute examples of this class of foamed resin.

While these organic foams adhere well to metal and are adapted to follow the thermal contraction or expansion and also the contours of metal and other substrates, a disadvantage thereof resides in the fact that they will withstand only a moderate degree of heat without being destroyed.

Another type of cellular material which has previously been prepared has been obtained by sintering in a refractory mold a mixture of finely pulverulent glass and a small amount of a pulverulent, carbonaceous material designed to react with oxygen-containing components of the glass, such as sulfates or ferric oxide, or with added ingredients, such as antimony trioxide, in order to generate gases in situ which are entrapped in the sintered glass mass. Subsequently, the foamed glass bodies must carefully be cooled and annealed over relatively long periods of time to relieve internal strains. An example of such process is contained in U.S. Pat. No. 2,123,536 to Long. It has also been proposed to sinter a mixture of glass-forming particles and a gassing agent in order to provide highly cellular glass. An illustration of such process is contained in U.S. Pat. No. 2,611,712 to Ford. The resultant cellular bodies are thermally insulative and are not decomposed or broken down even when heated to temperatures considerably higher than are admissible with heretofore available organic foams. However, even these are not resistant to such temperatures as may arise in high temperature applications. In fact, they may tend to break down at temperatures of about 800° F.

Another serious problem in the use of cellular glasses arises because they have quite different coefficients of thermal expansion than the metallic substrates to which they may be applied. Still another serious problem attending their use arises in the fact that no technique has heretofore been available for forming them as adherent layers in situ upon the articles to be protected. For example, it will be recognized that it would often be quite impractical to apply and hold the pulverulent material as an appropriate layer upon a part to be insulated, and then to heat the composite body so formed in order to sinter the glass in situ and to decompose the gassing agent, thereby providing bubbles of gas in the sintered mass.

Still another type of refractory material which has heretofore been suggested comprises froth or foam obtained from silica at very high temperatures, e.g., about 3000° F. or above. This material has high heat resistance, but is expensive since it requires expensive furnaces for its production, is difficult to provide in desired shapes or forms, and is not very good in thermal insulation.

The foams contemplated by this invention combine the advantages of both organic and inorganic foams and, in fact, in the high temperature field, they often are superior to any of the recognized foams, even the foamed glass as heretofore employed. One feature of the invention is in the provision of a foamable mixture comprising an organic unsaturated polyester resin binder a blowing agent, as in a conventional foamable mixture, but further containing in appropriate amount and in pulverulent state, a relatively refractory inorganic material, and a flux for said refractory material. Such mixture can be spread on surfaces of various contours and can be introduced into cavities of bodies to be filled or into molds, and then foamed and cured much the same as a conventional unsaturated polyester resin foamable mixture. The resultant mixture when cured initially is essentially an organic foam wherein the pulverulent refractory material is suspended or distributed with little or no cohesion between the particles thereof. In this foam, the unsaturated polyester resin provides a foamed scaffold for refractory material and flux, holding the same in desired position. This organic foam, like many other conventional organic foams, has good strength and good insulative value at low or moderate temperatures. It is also resistant to permeation by moisture and by chemical agencies. Structures, when protected therewith are well able to withstand the effectives of corrosive agencies and are quite resistant to transmission of heat.

However, in these foams, unlike conventional organic insulative foams, if exposed before or during service to temperatures sufficiently high to char the organic material, the unsaturated polyester resin will be converted to a carbonaceous char which retains, at least to a large extent, the original cellular structure of the initial foam and for that reason is still a very good insulator even at temperatures too high to admit the use of a conventional organic foamed material. The charred unsaturated polyester resin still provides a good scaffold for the refractory material and the flux. In event that the foam contains pulverulent amorphous silica as a fill material, the charring stage is also attended by a changing of a phase to crystalline silica, such as crystobilite; at 1200° F. the change is about 50 percent complete; at higher temperatures other phases of silica, such as alpha-quartz and tridymite, are present. Obviously, crystalline silica in finely pulverized state could also be used initially.

If the charred foam is heated to still a higher temperature, the charred unsaturated polyester resin is gradually burned out of the foam and the particles of refractory material are united by sintering with the fluxing material to provide a coherent, strong, cellular, inorganic foam structure containing a substantial percentage of closed cells and wherein much of the form of the original foamed organic scaffolding is retained. This sintered foam has good insulating values at a temperature in a range far above that which has heretofore been attained with organic foams or even with foamed glass. In fact, it is substantially more effective as a high temperature thermal insulator than the foam of silica obtained by foaming fused silica.

The heating of the initial foam comprising the unsaturated polyester resin binder to effect transition through the stages of charring and likewise the ultimate stage of burning out of the charred material to provide a coherent, high resistant, inorganic body, may be effected deliberately and before the body wherein the foam is contained is subjected to service. An advantage of so doing resides in the fact that the inorganic foam is very hard and strong at all stages of service. Also, if it is exposed to high temperatures, fumes and gases are not generated. The material is usually also lower in density after the organic material is removed. It has also been found that the refractory filled unsaturated polyester foams fired under controlled conditions produce economical, inorganic foams which have good dimensional stability, which are resistant to cracking or spalling, and which better withstand higher temperatures and repeated heat cycling than related systems heretofore known in the art.

However, in many applications the foamable mixture will be applied and then foamed and cured, and the resultant body will be introduced into service and the final transformation to a char or to a coherent inorganic body then left to the exigencies of service. Such exigencies may not actually arise and the foamed material during its entire service life will be in the initial state involving the foam wherein the organic binder is the essential element. However, it will be recognized that in such foam, the refractory fill material will always be available to form the foamed char or the final inorganic foam, should conditions arise, either by accident or by design, to induce conversion.

For some purposes, there are advantages in the application of the organic foams in their initial state. For example, they are more impervious to liquids and gases. Then too, the transition thereof to a char and then to an ultimate foam is attended by ablation of the organic components. This ablation, within itself, produces cooling effects and greatly increases the resistance of the foamed material to heat. This advantage of dissipation of heat through ablation cannot be attained if the organic material is burned out to convert the foam to its final state before it is used. The cooling effects of ablation are particularly advantageous if the foamed body is to be exposed to conflagration conditions or is employed, for example, as a nose cone of a rocket or as a heat shield on a space capsule, wherein very high and destructive temperatures are encountered usually for a fairly short period of time.

The inorganic foam left after the organic binder is ablated away still provides good high temperature insulation, protecting the substrate beneath. If the surface temperature becomes sufficiently high in a rocket nose cone or in a space capsule heat shield, the surface of said foam may also tend to ablate away to dissipate a part of the heat while the insulative inorganic foam layers beneath slow up the heating of the substrate. Conventional foamed glasses such as are disclosed in the patents aforesaid, are not well adapted to withstand such conditions.

The resistance to heat of the foams in their final state wherein the organic material has been ablated away is surprising inasmuch as foamed glasses will fail at these temperatures, and the foams herein disclosed at least initially contain a flux along with the organic phase and the blowing agents, and the charring and burning away of the organic material at least to some extent allows interaction of the refractory filler and the fluxing agent to bind the particles of filler together. To this extent, the final product often contains glass and might be expected to fail in the same manner as conventional foamed glass and at substantially the same temperature ranges as the latter.

The refractory fillers

Many refractory inorganic materials in pulverulent state may be used as fillers in the foams. Many of these are oxides or carbides of metals. Refractory inorganic oxides are preferred. The heat resistant materials known as cermets (or the components thereof) may also be used. It will be recognized that silica ($SiO_2$) is an exceedingly common and inexpensive inorganic filler ingredient. Silica, it is to be recognized, may exist in amorphous as well as numerous crystalline states. Pulverulent silica suitable for use in the practice of the invention may be obtained by grinding quartz or sand, or by grinding silica precipitated from sodium silicate, or by grinding so-called silica Aerogal. It appears that in event the pulverulent silica is amorphous, there is a conversion or transition thereof when the foam is subjected to high temperature, for example, to the temperature of charring or ultimate burning of the organic material, and the inorganic foamed product contains crystalline silica.

While the interaction of silica and fluxing agent provides glass, examination of the final inorganic foams herein disclosed shows that a major portion of the final foam structure consists of crystalline silica. Often the glass phase is difficult to detect even by examination of the foam with an optional microscope of considerable power. However, it must be present. Usually, in the sintered material the body still contains about 90 percent to 99 percent of silica particles. The particles are sintered or bridged together by a small but largely invisible glasslike phase. In some instances, at least a part of the bond between particles may be provided by co-crystallization between the particles of refractory material.

While silica in pulverulent state and flux may be used as the filler material of applicants' foams without other refractory additives, it is also contemplated to add to, or substantially completely to replace the silica by other refractory pulverulent materials, of which the following constitutes a partial list from which selection may be made:

$Al_2O_3$
$ZrO_2$
$TiO_2$
$ThO_2$ (either commercial or nuclear grades)
$Sb_2O_3$
$ZrO_2+SiO_2$
$ZrO_2+TiO_2$
$TiO_2+SiO_2$
$Al_2O_3+SiO_2$
Tungsten oxide
$Al_2O_3+ZrO_2$
Boron oxide
Tungsten carbide
Boron carbide
Tungsten metal
Boron metal
Calcium zirconate
Magnesium zirconate
Asbestos fibers (various types)$+SiO_2$
Fiber Frax (various types)$+SiO_2$
Pluton fibers (organic)$+SiO_2$
Quartz fibers$+SiO_2$
White glass enamel (a powdered glass)
Vanadium pentoxide ($V_2O_5$)
Various natural and synthetic silicates
Eccospheres [1]:
    R (alone)
    R$+SiO_2$
    Si (alone)
    Si$+SiO_2$

[1] Minute hollow spheres of silica.

Mixtures of these various refractory fillers may be used. Cermets in pulverulent forms or the pulverulent forms of the components of cermets may also be used as the refractory filler components. Adjuvants may also be used with the fillers, for example, powdered nickel and lead silicate, powdered chromium with aluminum silicate, tungsten with aluminum oxide or molybdenum, and with calcium and aluminum oxides. The foregoing combinations may also include brazing agents, such as niobium, titanium, tantalum and zirconium, to bond the ceramic particles to the metal particles. These brazing agents may also be used to bond refractory coatings to metallic substrates.

A preferred group of refractory fillers contemplated by this invention comprises at least a major amount of alumina, zirconia, or a mixture of alumina and zirconia. The refractory filler may also contain minor amounts of other known refractory materials. Preferably, the refractory filler comprises at least about 60 percent alumina and/or zirconia.

While the use of zirconia produces inorganic foams having highly desired properties, it has been found that it is preferable to use zirconia containing a stabilizing amount of an oxide, usually about 1 percent to 7 percent, such as calcium oxide, magnesium oxide and yttrium oxide. These stabilized zirconias are disclosed in the National Bureau of Standards, Journal of Research, vol. 35, 1945. Apparently, zirconia stabilized with oxides, such as calcium oxide, at 2800° F. to 2850° F., converts to the cubic crystal form which is subject to no further inversions when under thermal shock, whereas unstabilized zirconia passes through various crystalline forms during thermal shock, thereby causing stresses and strains which may eventually weaken the inorganic foam. It would thus appear that the inorganic foams containing stabilized zirconia better withstand repeated thermal shock.

When present, silica ($SiO_2$) is preferably employed as the minor refractory filler constituent. However, many refractory inorganic materials may be employed as fillers in the foam. Many of these are oxides or carbides of metals. The heat resistant materials known as cermets may be used. For example, selection may be made from the partial list of known refractory materials above. The particle size of the filler is not critical. It should, however, be in pulverulent form, for example, particle size in a range of about 0.2 micron to about 550 microns may usually be employed. Particle sizes smaller or larger may also be used.

Heat resistant fibers

Organic or inorganic fibers, when incorporated along with the pulverulent materials above listed, have been found substantially to enhance the strength of foams, especially when they are in charred state or in the fully fired state wherein substantially all of the carbonaceous material has been ablated away.

Inorganic fibers are especially useful in foams which are to be heated to relatively high temperatures.

Suitable refractory fibers include: asbestos, quartz fibers, glass fibers, heat resistant organic fibers, carbonaceous fibers, inorganic fibers, steel wire and stainless steel wire. Useful fibers include those described in Chemical Week, June 9, 1962, pages 61–64; Materials in Design Engineering, October, 1962, pages 12–13; and Chemical Engineering Progress, October, 1962, pages 37–41.

Included among the fibrous materials described are zirconia fibers such as Zirconia A, a calcia stabilized zirconia; Zirconia C and Zircon, silica containing zirconias, Fiberfrax, aluminum silicate fibers; and carbonaceous fibers such as Pluton-B, Graphite, and Hitco-C fibers.

Preferably the fibers utilized in the compositions of this invention are selected from asbestos or alumina silicate fibers. The fibrous material may be employed in an amount in a range of about 0.25 percent to about 50 percent by weight based upon the inorganic refractory material. Usually the fibers are employed in an amount of about 1 percent by weight based upon the inorganic refractory material. Usually the fibers are employed in an amount of about 1 percent by weight.

Fluxes

Fluxing materials which may be used in combination with the various refractory filler materials in the foams of this invention comprise those which have heretofore been employed in the glass industry and comprise fusible compounds of metals of the first and second groups of the Periodic Table, such as:

| | |
|---|---|
| Sodium carbonate | Calcium bicarbonate |
| Sodium bicarbonate | Magnesium carbonate |
| Potassium carbonate | Barium chloride |
| Potassium bicarbonate | Calcium chloride |
| Sodium hydroxide | Borax |
| Potassium hydroxide | Sodium acetate |
| Calcium carbonate | | and others. In some cases, the use of the calcium compounds are preferred. Some of these have an added capacity of reacting with acids in the foamable mixture to generate carbon dioxide, thus giving foaming action. The amount of the fluxing agent is susceptible to considerable variation, dependent upon the degree of resistance to high temperature required in the products obtained, by heating the initial foams or the chars thereof to high temperatures. It is considered that most of the mixtures of filler and fluxing agent will comprise from about 1.0 percent to about 45 percent of the fluxing agent based upon the total mixture of the refractory filler and said fluxing agent.

Resins for use in the foamable mixtures

Resins which may be used in forming the foams are the class comprising thermosetting interpolymerizable unsaturated polyester-monomer mixtures. They preferably are initially liquids or can be rendered liquid by incorporation of appropriate polymerizable or vaporizable diluents. They are of thermosetting character. That is, they do not tend to melt down when subjected to heat, but rather tend to become hard. These resins will usually char or burn up without actually melting and if subjected to a sufficiently high temperature, will give a carbonaceous skeleton still loaded with the pulverulent fill materials and still characterized by much of their original cellular structure. Also, they usually will adhere to the substrates to which they are applied.

Surprisingly, it has been found that the use of unsaturated polyester resin binders produces foam chars and inorganic refractory foams which are far superior to those where attempts were made to replace the polyesters with other types of thermosetting resins, such as polyurethanes, polyepoxides, phenol-aldehyde resins, or urea-formaldehyde resins.

Especially satisfactory thermosetting resinifiable polyester-monomer mixtures for use as the organic component in the foams of this invention comprise foamable interpolymerizable mixtures of a so-called unsaturated polyester and a $>C=CH_2$ monomer of the type presented in U.S. Pat. No. 2,593,787 to Parker. In these systems, the polyester contains as an initial component, at least a portion of an alpha, beta-ethylenic dicarboxylic acid, but the polyester need not necessarily be the sole acid. Various unsaturated dicarboxylic acids or acids which are functionally saturated may be present. Such functionally saturated dicarboxylic acids include phthalic acid, isophthalic acid, terephthalic acid, endomethylenetetra- chloro- or endomethylenetetrabromophthalic acid, and aliphatic dicarboxylic acids represented by succinic acid, adipic acid, sebacic acid and others. In proportioning the two types of acids in the polyester, the molecular ratio of the functionally saturated component may vary in a range of about 0.25 mole to about 6 moles per mole of the ethylenically unsaturated component. The acid (or anhydride) component is esterified with a dihydric alcohol, such as ethylene glycol, propylene glycol, 1,2-butylene glycol, diethylene glycol, triethylene glycol, dipropylene glycol or other glycols, in an amount usually slightly (e.g., 1 percent to 10 percent) in excess of equivalency of the acid component.

Another method of preparing the unsaturated polyesters employed in the foams of this invention comprises the reaction of an alpha, beta-ethylenic dicarboxylic acid or anhydride, as set forth above, and an organic oxide which may be regarded as being an anhydride of the corresponding glycol, i.e., a compound containing an oxirane ring.

In U.S. Pat. No. 2,822,350 to Hayes, it is disclosed to form polyesters of dicarboxylic acids and dihydric alcohols by reaction of an anhydride of a dicarboxylic acid and an alkylene oxide in the presence of a catalyst containing as an effective cationic portion, a base such as an alkali metal or an amine, in the presence of a small amount of water.

In copending application Ser. No. 231,767, filed Oct. 9, 1962, there is disclosed a method of preparing unsaturated polyesters by the reaction of an alpha, beta-ethylenic dicarboxylic acid anhydride and an alkylene oxide in the presence of a polyhydric alcohol and/or a carboxylic acid.

The unsaturated polyesters obtained in any of the foregoing manners may be mixed with various monomers containing a $>C=CH_2$ group, as disclosed in the foregoing Parker patent. The most economical of these monomers and one of the most satisfactory for general use, however, comprises styrene or vinyl toluene; methyl methacrylate and chlorostyrene from among others disclosed may be used. The monomers may be added in an amount varying within a range of about 10 percent to about 40 percent based upon the polyester-monomer mixture.

Most polyester-monomer mixtures include a small amount, e.g., about 0.001 percent to about 1 percent, of a gelation inhibitor, such as quinone, hydroquinone, tertiary butyl catechol and 3-isopropyl catechol. They may also include small amounts (e.g., 0.01 percent to about 3 percent by weight based upon the interpolymerizable components) of quaternary ammonium salts, represented by dimethyl benzyl ammonium chloride or diisobutyl phenoxy ethoxy ethyl dimethyl benzyl ammonium chloride, sold as Hyamine 1622. These often act in uncatalyzed mixtures as gelation inhibitors (see U.S. Pat. No. 2,593,787 to Parker) or, when the mixture is catalyzed, as gelation promoters (see U.S. Pat. No. 2,740,765 to Parker). Other auxiliary ingredients may be included, for example, to speed up curing. The mixture is catalyzed by the addition of such well-known peroxidic catalysts as methyl ethyl ketone peroxide, cumene hydroperoxide, benzoyl peroxide and others. The catalyst may be used in an amount of about 0.1 percent by weight based upon the interpolymerizable components.

If the mixture is to be cured at low temperatures, for example, at room temperature, it is advantageous to add an accelerator, such as one of the siccatives used in the drying of oil-based paints. These include salts of cobalt, copper, lead, nickel, chromium, and higher fatty acids such as octoic acid, oleic acid, naphenic acid, and others. These catalysts are not always necessary, especially if the mixtures can be heated to a substantial temperature.

In order to improve the foaming characteristics of the foregoing resinifiable components, additives are often included. One of these comprises an amulsifier or surfactant such as are disclosed in the publication entitled Detergents and Emulsifiers—Up to Date (1960), published by John W. McCutcheon, Inc., 475 5th Ave., New York, N.Y. These surfactants are used in relatively small amounts, for example, about 0.1 percent to about 3 percent based upon the organic components of the mixture. The surfactants may be non-ionic, anionic, cationic, or mixtures of two or more thereof. A representative member of the family is known as Tween 20 or Tween 21 and is described as polyoxyethylene sorbitan monolaurate. An example of a cationic surfactant comprises Hyamine 1622, which is described as polyoxyethylene sorbitan monolaurate. An example of a cationic surfactant comprises Hyamine 1622, which is described as diisobutyl phenoxy ethoxy ethyl dimethyl benzyl ammonium chloride. The several classes of surfactants may be used singly or in combination. The invention also includes the formation of filled foams in the substantial absence of surfactants. If surfactants are used, the amount may be in a range of about 0.1 percent to about 5 percent based upon the total of the resinifiable components in the mixture.

It is often desirable to include in the foamable mixture an appropriate agent designed to improve the wet strength of films formed in the foaming operation and thus to give stability to the freshly formed foams until partial setting of the resinifiable components is attained. Such foam stabilizers are well recognized in the art and are represented by such materials as cellulose acetate butyrate, ethyl cellulose, benzyl cellulose, chlorinated natural rubber and others.

Blowing agents

The term "blowing agent" is used to designate various agents that will produce a cellulated froth or foam-like body. For example, air or other fixed gas may be introduced by beating or by compression to produce foaming. Therefore, under the provisions of this invention, it is termed "a blowing agent." Volatile compounds, such as $CCl_3F$, may also be termed blowing agents, as may such chemicals as ammonium carbonate or nitrate, or diazoaminobenzene, which will decompose in the mixture to give foaming. These, under the terms of this invention, are blowing agents.

This invention includes the addition of a gas, such as carbon dioxide, nitrogen, argon, helium or air, to interpolymerizable mixture under a considerable pressure so that a substantial amount thereof goes into solution. When the pressure is released, the gaseous medium in solution volatilizes to produce foam formation. The organic material is then cured.

Still other systems of blowing may be used. For example, the mixture may be subjected to an appropriate frothing operation as by whipping with carbon dioxide gas, air or nitrogen. A relatively volatile chlorofluorocarbon, such as $CCl_3F$, $CCl_2F_2$, or other similar agents, or a combination thereof with carbon dioxide or similar gaseous blowing agents may be introduced into the resin-filler mixture and allowed to foam and set to solid state. When the volatile chlorofluorocarbons are employed to produce foaming action, it is preferable that the foamable mixture be prechilled to a temperature of about 50° F. or to such other temperature as will effectively maintain the blowing agent in solution in the mixture. When the mixture is allowed to warm up in curing, the halocarbon volatilizes to provide a suitable foam structure containing the filler material in suspension therein.

While these and other systems may be used in forming foamable mixtures in the practice of the present invention, a presently preferred system for producing foaming comprises the use of an alkali metal carbonate or bicarbonate and an acid, such as a free carboxylic acid. These react to liberate carbon dioxide in situ. The anhydride of the acid may be used in place of the acid, but water should also be added in order to split the anhydride ring thereof and thus regenerate carboxyl groups. The over-all result is substantially the same with either free carboxylic acid or the anhydride thereof. However, it will be apparent that the use of the anhydride and water does provide a time lag in the onset of the foaming action because time must be allowed after the mixing of the several ingredients to allow the water to split the anhydride rings before reaction between the carbonates and the free acid groups can take place. This time lag is advantageous since it allows more time for thorough mixing of the ingredients and allows time to handle and transfer the material before substantial foaming occurs. In this foaming process, potassium bicarbonate and sodium bicarbonate may be used in the alternative; however, sodium bicarbonate is usually preferred because it is considerably less expensive than the corresponding potassium compound.

Although the alkali metal compound is reacted with the organic acid to form a salt, the latter is still retained in the foamed mixture and when the latter is highly heated as, for example, to the charring or burning temperature, the alkali metal salt is decomposed to provide alkali metal oxide, which combines with the silica to form glass in situ. The latter retains much of the cellular structure of the charred mass in which it is formed.

Combinations of blowing agents may be used.

In the formulation of foams in accordance with the provisions of the present invention, various polyester materials and mixtures thereof with various monomers may be employed. The following constitute examples illustrating a few polyesters and mixtures that may be used in the practice of this invention.

EXAMPLE A

In accordance with this example, a polyesther was prepared comprising:

| | Moles |
|---|---|
| Maleic anhydride | 60 |
| Isophthalic acid | 40 |
| Propylene glycol | 35 |
| Triethylene glycol | 63 |

This mixture was cooked with an appropriate inhibitor of gelation, namely, 0.0012 percent of hydroquinone. The techniques of cooking were those conventional in the art and need not be elaborated upon herein. The finished polyester was thinned with 18 percent, based upon the mixture, of styrene. It was stabilized with 0.2 percent of a salt of a quaternary ammonium compound (Hyamine 1622) and 0.01 percent of copper naphthenate. This polyester could be incorporated with refractory oxides of metals which are adapted to react with fluxes to form a glass. The mixtures, when heated to a sufficient temperature, would char to give a cellulated body. The latter, when further heated, would give foams as herein disclosed.

EXAMPLE B

In like manner, a polyester was prepared comprising:

| | Moles |
|---|---|
| Ethylene glycol | 10.6 |
| Maleic anhydride | 4.0 |
| Tetrachlorophthalic anhydride | 6.0 |

This mixture was fusion cooked at 210° C. The resultant resin was thinned with 20 percent of styrene based upon the mixture and was stabilized with 0.02 percent of hydroquinone and 0.2 percent of Hyamine 1622. Also included was 0.05 percent of copper naphthenate in styrene. The resultant interpolymerizable mixture could be mixed with an oxide of a glass-forming metal and foamed and gelled. The foam could be heated first to form a char and finally to provide an inorganic cellular body.

EXAMPLE C

The esterification mixture in this example comprised:

| | Moles |
|---|---|
| Diethylene glycol | 11.0 |
| Maleic anhydride | 10.0 |
| Benzoic acid | 0.5 |

The foregoing mixture was stabilized with 0.02 percent of hydroquinone and was cooked in conventional manner to provide a polyester which is thinned with 20 percent based upon the mixture, of monomer (styrene). This mixture could also be compounded first to give an organic foam, and finally to give an inorganic cellular body.

EXAMPLE D

The polyester of this example comprised:

| | Moles |
|---|---|
| Maleic anhydride | 6.0 |
| Isophthalic acid | 4.0 |
| Triethylene glycol | 9.4 |

These constituents were cooked to provide a polyester of an acid value of 40 and a hydroxyl value of 5. The material, it will be observed, contained a slight excess of the acid component. It is considered that the residual acid may react with alkali metal bicarbonate to give carbon dioxide.

To this polyester were added as an inhibitor and an accelerator:

| | Percent [1] |
|---|---|
| Hydroquinone | 0.02 |
| Copper naphthenate | 0.005 |

[1] Percentages are by weight based upon the polyester.

This mixture, in an amount of 91 parts by weight, was thinned with 18 parts by weight of styrene. The resultant mixture in this and subsequent examples is designated as Mixture (D).

EXAMPLE E

The polyester of this example comprised equal moles of maleic anhydride and phthalic anhydride esterified with approximately an equivalency of diethylene glycol. The acid value of the polyester was about 40 and the hydroxyl value was about 5. This polyester was made up into a filled mixture, and foamed and cured.

In forming the heat resistant, cellular bodies contemplated by the present invention using any of the foregoing polyesters, the refractory fillers previously disclosed may be used as the refractory filler material. The refractory fillers are blended into an unsaturated polyester resin along with the fluxing agent and fibrous material, if present, such as sodium bicarbonate or others of these heretofore listed. The inorganic components are mixed with the organic resinifiable components. Assuming that sodium bicarbonate ($NaHCO_3$) is used as the fluxing agent, maleic anhydride is added, together with an appropriate amount of water. The water reacts with the maleic anhydride ring, thus producing maleic acid, which in turn reacts with the sodium bicarbonate to produce carbon dioxide that induces foaming. Sodium maleate is also produced. The latter remains in the organic material in a condition to react with the refractory filler material in event that the foam is sufficiently heated. The mixture also may include a peroxidic catalyst of interpolymerization.

In proportioning the several ingredients in the foamable mixture, substantial variations of amounts of the organic materials and refractory constituents may be used. About equal amounts of the organic material and inorganic material have been found to produce good foams. Preferably there may be used from about 15 percent to about 75 percent of organic foam-forming ingredients, and, more preferably, about 25 percent to about 60 percent organic foam-forming ingredients, the rest being the sum of the inorganic foam-forming agents.

The product of foaming and interpolymerization may be heated in an appropriate apparatus, such as an electrically or gas-heated furnace, or a moving bed kiln, to a temperature in a range of about 800° F. to about 1200° F. or even 1600° F. depending on the length of time exposed, or higher, whereby the organic foamed binder is burned away, leaving a cellular carbonaceous char of a body wherein the scaffolding for the pulverulent refractory material is a carbonaceous char formed from the original organic mateial. It is of good strength and contains about 20 percent to 30 percent of closed cells.

Assuming that the inorganic refractory filler material is silica or similar low melting refractory, the chars, or oganic foams, if heated to about 1800° F. to about 2200° F., are converted to a coherent inorganic material. The product has substantially greater mechanical strength than the char and the percentage of closed cells is about 20 percent to about 70 percent. The resultant inorganic cellular product will resist temperatures above 2200° F. The products of highest resistance to heat are obtained by increasing the proportion of higher melting metal oxides and carbides, and concomitantly lowering the amount of fluxing agent. In the case of higher melting refractory fillers, such as alumina and zirconia, the chars must be heated to higher temperatures to produce the strongest refractory foams. Temperatures between about 2600° F. and 4000° F. are usually employed, preferably between 2800° F. and 3200° F. In general, inorganic foams of relatively high density are more resistant to higher temperatures than those of lower density.

In order to obtain inorganic foams of the highest strength and most uniform structure, the filled organic foam or char may be heated incrementally or continuously from its ambient temperature to the maximum temperature over a period of time and in such a manner that the temperature differential between the outer portions of the cellular body and the inner portions of the cellular body are not so great as to cause fissures, crazing, or lack of uniform structure. Preferably, the heating should not be so rapid as to cause substantial conflagration of the polyester binder due to the attendant hot spots. Likewise, the inorganic foam may be annealed after formation, that is, cooled at such a rate that undue internal stresses or thermal shock are avoided.

The foams from which the organic material has been ablated away are usually of lower density than those containing the organic binders still intact, although in some cases, zirconia, for example, the inorganic foams may have a higher density.

Foamed bodies still containing the organic material and being of densities of about 60 to about 95 pounds per cubic foot may be used as ablation agents. The strength of the foamed materials of such density may be increased by incorporating fibers of refractory materials, such as asbestos or silica fibers or fiber glass, along with the refractory material. Cellular bodies containing fibrous materials and of the foregoing densities have been found to withstand temperatures in a range of 5000° F. to 6000° F. for several minutes. The material, after the organic material has been ablated away, has been found to be resistant to 10 percent solutions of hydrochloric acid, nitric acid or sulfuric acid for several weeks, and also to resist the same solutions at temperatures of 80° C. to 100° C. for several hours.

Many methods of heating the filled polyester foam precursors may be used to produce the inorganic foams of this invention. One method involves first placing the foam in an oven, preferably having a moderate forced air flow to carry off gaseous products. The temperature is then gradually raised to the desired point and the temperature then either continuously is lowered or heating is discontinued and the oven containing the inorganic foam allowed to cool to a relatively low temperature before removing the foam.

Another method is to place the sample in an oven heated to a temperature sufficient to char the polyester resin binder without substantial conflagration of the polyester resin binder. This temperature is usually in the range of about 600° F. to 800° F. After a char has been achieved, the temperature is raised to the maximum desired temperature to produce the final inorganic foam.

Still another method for firing the foam of this invention involves the use of a moving bed tunnel kiln such as is utilized in the ceramics industry, wherein the temperature gradient increases toward a maximum in the center of the kiln. This type of kiln is highly suited for use in producing the inorganic foams contemplated by this invention.

The following constitute examples illustrating the preparation of foams initially containing an organic binder along with inorganic refractory fill material, and being adapted for heat treatment, first to provide a char and/or to provide a coherent inorganic foam in accordance with the provisions of the present invention. In these examples, the foams of the foregoing examples were used.

EXAMPLE I

The filled and foamable mixture of this example comprised:

| | Grams |
|---|---|
| Polyester-monomer mixture (Example D) | 25.0 |
| Silica | 12.5 |
| Sodium bicarbonate | 5.8 |
| Acetic acid | 1.0 |
| Methyl ethyl ketone peroxide | 0.3 |

The resultant mixture was gelled and cured without extraneous heat. When the resinous body was heated in an oven at 1000° F. to 1600° F., the organic material was burned off, leaving a foamed, insulative body composed largely of cohered particles of silica.

EXAMPLE II

In this example, air was whipped into the filled interpolymerizable mixture by means of a high-speed agitator to provide a froth-like foam. The interpolymerizable mixture comprised:

| | Grams |
|---|---|
| Polyester-monomer mixture (Example D) | 100.0 |
| NaHCO$_3$ | 68.0 |
| Silica | 151.0 |
| Cobalt octoate | 0.3 |
| Hyamine 1622 [1] | 0.3 |
| Tween 20 (emulsifier) | 1.0 |
| Cellulose acetate butyrate | 2.0 |
| Trichloroacetic acid | 0.3 |
| Styrene | 80.0 |
| Methyl ethyl ketone peroxide (DDM) | 1.0 |

[1] The Hyamine 1622, a quaternary ammonium salt, is helpful in several respects. It prevents premature gelling of the uncatalyzed mixture. It is a cationic surfactant and assists emulsification. It also may promote gelation after catalyst is added. However, useful foams may be obtained without employment of the same.

These ingredients were frothed with a high-speed mixer and were cast and cured without application of extraneous heat. The resultant cast foam had a density of 86.7 pounds per cubic foot.

In a second run of the same composition, a small amount of CCl$_3$F (a blowing agent operating by vaporization) was added. The sample of foam obtained had a density of 69.7 pounds per cubic foot. Both of the foams of this example were subjected to a Bunsen flame in order to burn out organic matter. The resultant chars were then baked in a muffle oven at 1500° F. to 1600° F. for 10 to 15 minutes. A foamed structure was obtained which comprises particles of crystalline silica bonded into a strong body by minor amounts of glass.

EXAMPLE III

The filled interpolymerized mixture comprised:

| | Grams |
|---|---|
| Polyester (same as Example E) | 9100.0 |
| Silica | 5510.0 |
| Sodium bicarbonate | 2540.0 |
| Cellulose acetate butyrate (film former) | 182.0 |
| Styrene | 1100.0 |
| Cobalt octoate (accelerator) | 18.2 |
| Fumaric acid (foam stabilizer) | 27.3 |
| Tween 20 (emulsifier) | 45.5 |
| Copper naphthenate (accelerator) | 4.6 |

This mixture was blended under pressure with CO$_2$ at a rate of 0.5 gram of CO$_2$ per 100 grams of resin to give a froth or foam. One sample of this mixture was catalyzed with 1 percent by weight based upon the total formulation of methyl ethyl ketone peroxide. A second sample was catalyzed with 0.5 percent upon a like basis of the same catalyst. The mixture was cured without extraneous heat to provide a foam. The cell structure of this foam was not destroyed by application of a Bunsen flame to burn out the organic material. The density of the original foam was about 25 pounds per cubic foot.

The following examples illustrate the forming of filled organic foams wherein water and maleic anhydride are added to provide free maleic acid to react with the alkali metal bicarbonate for purposes of generating carbon dioxide in situ.

EXAMPLE IV

The polyester employed was the same as that disclosed in Example E and contained 0.02 percent by weight of hydroquinone and 0.005 percent by weight of copper naphthenate. The interpolymerizable mixture comprised:

Filled composition (W)

| | Grams |
|---|---|
| Polyester | 9100.0 |
| Cellulose acetate butyrate | 182.0 |
| Styrene (total) | 1830.0 |
| Cobalt octoate (accelerator) | 18.2 |
| Hyamine 1622 (accelerator emulsifier) | 27.3 |
| Fumaric acid (foam stabilizer) | 27.3 |
| Tween 20 (emulsifier) | 45.5 |
| Silica | 7740.0 |
| Sodium bicarbonate | 3490.0 |

This mixture is termed "Filled Composition (W)" and is so designated in the examples wherein the foregoing mixture is employed. To a 200-gram sample of the filled mixture were added 10 grams of maleic anhydride. The mixture was stirred vigorously for 2 to 3 minutes and 2 grams of water were added. The mixture was further stirred for 30 seconds and 1 gram of methyl ethyl ketone peroxide was stirred in over an additional 30 seconds. The mixture began to foam in 2 or 3 minutes. Gelation took place in 4 to 5 minutes. A rigid foam was obtained at atmospheric temperatures. The filled organic foam was a thermal insulator. The organic foam constituents could be burned out to leave a cellular char which, when further heated, would provide a coherent body consisting largely of particles of silica bonded together by a minor amount of glass.

EXAMPLE V

In a further example, the filled composition (W) was employed with CCl$_3$F as a gassing agent. The mixture comprised:

| | Grams |
|---|---|
| Filled composition (W) | 200.0 |
| CCl$_3$F | 10.0 |
| Methyl ethyl ketone peroxide | 0.5 |

The mixture foamed and cured without extraneous heat, but the density was more difficult to control than the mixture of the preceding example wherein sodium bicarbonate was acted upon by maleic acid generated by hydrolysis of maleic anhydride. This difficulty might be reduced by reducing the amount of catalyst or by using a slower catalyst.

EXAMPLE VI

In this example, ammonium bicarbonate is used as a gas-producing agent. The mixture comprised:

| | Grams |
|---|---|
| Filled composition (W) | 200.0 |
| Ammonium bicarbonate | 2.0 |
| Styrene | 10.0 |
| Cumene hydroperoxide | 0.5 |

The mixture was heated in an oven at 150° F. to provide a filled foam. This was useful as heat insulation at normal temperatures. It was also an ablation agent and if the organic material were ablated, a useful coherent inorganic foam would remain.

Mixtures of the foamable polyester resin compositions containing a filling of pulverulent refractory material and a flux, such as have been described, may be sprayed or otherwise spread upon a surface to be coated and foamed, and the foams in their subsequent states conform to the surface. The foamable mixtures may also be cast into molds and there foamed and cured. If desired, the resultant bodies may be burned to char, or to eliminate the organic material. The articles may be used as formed, or they may be cut to shapes and sizes.

The organic foams constituting temporary scaffolds carrying a filling of pulverulent refractory ingredients and a flux therefor, will conform to and adhere to the surface of the substrate and will hold the foam in place so long as it is not subjected to temperatures that will break down the organic material. Since the foams may be without firing over long periods of time or even the entire life of the laminate, the bonding between the organic material and the substrate may provide a sufficient holding effect. The burning out or charring effect upon the organic material in the foam can be expected to progress inwardly only very slowly, so that even the surface of the foam has been exposed to high temperatures for a long time. The inner portions thereof near the metal will remain intact to hold the charred or even sintered surface layers firmly in place. If bricks, slabs or other shapes of the preliminarily foamed and sintered, or completely fired material are to be applied to a surface, it may be desirable to provide some auxiliary means which will hold the foam in place upon the substrate. For instance, the foam may be held by cements, clamps or rivets, or the like. Often, bricks of the foam wherein the organic material has been charred or eliminated by burning, may be laid up to provide a free-standing wall.

If desired, the substrate and/or the foamed refractory may be preliminarily coated with an inorganic bonding agent and with or without pulverulent refractory material dispersed therein. For example, the substrate may be coated with a fusible, vitreous enamel which, when the foam is heated or when the substrate is heated, becomes softened so that the refractory foam is adhered more firmly in place. Units of the refractory foamed material may also be adhered together by such cements.

The procedure used in formulating the mixtures in the following example is followed by the subsequent examples. Those ingredients which are designated as optional in the following example are also optional in the subsequent examples. For best results, at least some of them or their equivalents are desirable. Thermosetting resin components, pulverulent refractory, flux, and some system for blowing or foaming are essential. Variations of the species of these ingredients are admissible.

EXAMPLE VII

In this example, the polyester-monomer mixture corresponded to that of Example A. Asbestos fiber was added in order to enhance the strength of the foam structure in its several stages. In forming the foam, a base mixture was prepared comprising:

Base mixture: Grams
Polyester-monomer mixture (same as example A) _____ 350.0
Cellulose acetate butyrate (dissolved in 35 grams of styrene (optional) _____ 7.0
Fumaric acid (optional) _____ 1.0
Emulsifier (Tween 20) (optional) _____ 1.7
Additional monomer (styrene) (optional) __ 160.0
Refractory filler ($SiO_2$) _____ 672.0
Foaming agent and flux ($NaHCO_3$) _____ 128.0
Asbestos fibers _____ 45.0

The foamable mixture comprised:

Foamable mixture: Grams
Base mixture (as above described) _____ 1200
Accelerator (cobalt octoate) (optional) ____ 2
Maleic anhydride (part of the foaming system) 12
Added styrene (optional) _____ 40
Dicyandimide (optional) _____ 30

The final additives comprised:

Final additions: Grams
Water (part of the foaming system) _____ 24
Catalyst (DDM [1]) (optional) _____ 2.4

[1] DDM is a 40 percent solution of methyl ethyl ketone peroxide in dibutyl phthalate.

The resultant mixture was poured into a mold where it slowly foamed and gelled to provide an interpolymer foamed resin of a density of 30.2 pounds per cubic foot. This foam was a good thermal insulator. When heated at a temperature above 1200° F. for several hours, it provided a highly refractory cellular insulation.

EXAMPLE VIII

The base material in this example comprised:

Base mixture: Grams
Polyester-monomer mixture (see example A) 54.6
Emulsifier (Tween 20) _____ 0.27
Cell strengthener (cellulose acetate butyrate in 5.5 grams of styrene) _____ 1.1
Refractory filler (tungsten oxide) _____ 109.7
Blowing agent and flux ($NaHCO_3$) _____ 13.0

The foamable mixture comprised:

Foamable mixture: Grams
Base mixture _____ 170.0
Styrene _____ 7.0
Cobalt octoate _____ 0.3
Maleic anhydride _____ 2.0
Dicyandimide _____ 4.1

Final additives:
Water _____ 3.4
Methyl ethyl ketone peroxide (DDM) _____ 0.3

The mixture was stirred and poured into a mold wherein it foamed and gelled in 6 minutes. The foamed material was subsequently fired at 1800° F.

EXAMPLE IX

The refractory filler employed in this example was boron metal. The base composition comprised:

Base mixture: Grams
Interpolymerizable mixture (same as Example A) _____ 32.5
Emulsifier (Tween 20) _____ 0.16
Refractory filler (boron metal) _____ 25.0
Blowing agent and flux ($NaHCO_3$) _____ 3.0
Added monomer (styrene) _____ 4.0

The foamable mixture comprised:

Foamable mixture: Grams
Base mixture (as above described) _____ 72.9
Cobalt octoate _____ 0.18
Styrene _____ 4.0
Maleic anhydride _____ 1.2
Dicyandimide _____ 2.4

Final additives: Grams
Water _____ 2.0
Methyl ethyl ketone peroxide _____ 0.2

The mixture was poured into a mold and was allowed to foam and gel.

EXAMPLE X

In this example, tungsten metal was employed as the glass-forming ingredient. The base composition comprised:

Base mixture: Grams
Polyester resin (same as Example A) _____ 56.2
Emulsifier (Tween 20) _____ 0.28
Cell strengthener (cellulose acetate butyrate in 5.5 grams of styrene) _____ 1.10
Refractory filler (powdered tungsten metal) _ 106.5
Blowing agent and flux ($NaHCO_3$) _____ 10.7

The foamable mixture comprised:

Foamable mixture: Grams
Base mixture _____ 164.5
Added styrene _____ 4.0
Accelerator (cobalt octoate) _____ 0.28
Maleic anhydride _____ 1.7
Dicyandimide _____ 4.1

Final additives:
Water _____ 3.3
Methyl ethyl ketone peroxide _____ 0.3

The mixture foamed and superficially gelled in 3 minutes.

EXAMPLE XI

In this example, the interpolymerizable mixture of polyester component and monomer component itself contained a plurality of polyesters. The first of these corresponded to the interpolymerizable mixture from Example A and the second corresponded to the interpolymerizable mixture of Example B. The base component of the foamable mixture was made up to comprise:

Base mixture: Grams
Interpolymerizable mixture of Example B __ 45.7
Interpolymerizable mixture of Example A ___ 9.0
Surfactant (Tween 20) _____ 0.42
Cellulose acetate butyrate (in 5.5 grams of styrene) _____ 1.10
Refractory filler material (magnesium zirconate) _____ 110.0
Blowing agent and flux ($NaHCO_3$) _____ 13.5
Added styrene _____ 8.0

The foamable mixture comprised:

Foamable mixture: Grams
Base mixture (as described above) _____ 185.0
Added styrene _____ 8.0
Cobalt octoate _____ 0.38
Maleic anhydride _____ 1.5
Dicyandiamide _____ 4.0

Final additives:
Water _____ 2.5
Methyl ethyl ketone peroxide _____ 0.4

The foregoing mixture was poured in a mold and foamed and gelled within a period of five minutes. The foamed product can be fired to produce a char of inorganic foam.

EXAMPLE XII

In this example the foamable mixture was filled with a mixture of silicone dioxide and zirconium dioxide which is designed to react with the sodium-containing component of the foamable mixture to provide a coherent foamed composition. The composition comprised:

Base mixture: Grams
Interpolymerizable mixture (same as Example A) _____ 200.0
Surfactant (Tween 20) _____ 1.0
Cell strengthener (cellulose acetate butyrate in 20 grams of styrene) _____ 4.0
Added styrene _____ 63.0
$SiO_2$ (refractory filler) _____ 245.2
Zirconium dioxide (refractory filler) _____ 147.60
Blowing agent and flux ($NaHCO_3$) _____ 50.0

The foamable mixture comprised:

Foamable mixture: Grams
Base mixture (as above described) _____ 300.0
Cobalt octoate _____ 0.51
Maleic anhydride _____ 3.0
Dicyandiamide _____ 7.50

Final additives:
Water _____ 6.0
Methyl ethyl ketone peroxide _____ 0.6

The mixture foamed gradually and gelled in 20 minutes. The resultant foam was post-cured at 200° F. for 1½ hours. The surface skin formed on the cured foam was sanded away, exposing a fine cell structure. The sample was then fired in an oven heated by a gas flame until the organic material was burned away. The temperature was held at 2000° F. for 1½ hours. The resultant sample was very strong and also of inorganic character.

EXAMPLE XIII

In this example, boron trioxide was employed as the refractory filler material. The base composition comprised:

Base mixture: Grams
Interpolymerizable mixture (same as Example A) _____ 84.5
Surfactant (Tween 20) _____ 0.42
Cell strengthener (cellulose acetate butyrate in 8.5 grams of styrene) _____ 1.7
Added styrene _____ 26.6
Boron trioxide (refractory filler) _____ 166.0
Blowing agent and flux ($NaHCO_3$) _____ 5.1

The foamable mixture comprised:

Foamable mixture: Grams
Base mixture (as above described) _____ 300.0
Cobalt octoate _____ 0.25
Added styrene _____ 8.0
Maleic anhydride _____ 3.0
Dicyandimide _____ 7.5

Final additives:
Water _____ 6.0
Methyl ethyl ketone peroxide _____ 0.3

The mixture was poured into a mold where it foamed and gelled in 20 minutes. The resultant foam was post-cured for 16 hours at 160° F.

EXAMPLE XIV

In this example, a mixture of boron carbide and silica was employed as a refractory filler material. The base composition comprised:

Base mixture: Grams
Polyester resin (same as Example A) _____ 84.5
Surfactant (Tween 20) _____ 0.42
Cell strengthener (cellulose acetate butyrate in 8.5 grams of styrene) _____ 1.7
Added styrene _____ 26.6
Boron carbide (refractory filler) _____ 62.0
$SiO_2$ (refractory filler) _____ 107.5
Blowing agent and flux ($NaHCO_3$) _____ 5.1

The foamable mixture comprised:

Foamable mixture: Grams
Base mixture _____ 300.0
Cobalt octoate _____ 0.51
Styrene _____ 3.0
Maleic anhydride _____ 3.0
Dicyandiamide _____ 7.5

Final additives:
Water _____ 6.0
Methyl ethyl ketone peroxide _____ 0.6

The mixture was poured into a mold where it gradually foamed and set up within a period of 15 minutes, and formed a firm gel in 30 minutes. The foamed product was placed in an electrical oven and heated to a temperature of 1800° F. for a period of 8 hours and 15 minutes.

EXAMPLE XV

The main distinguishing characteristic of the foamable mixture of this example resides in the use of a mixture of $SiO_2$ and tungsten carbide as the filler material. The base composition of the sample comprised:

Base mixture: Grams
Interpolymerizable mixture (same as Example A) _____ 84.5
Surfactant (Tween 20) _____ 0.42
Added styrene _____ 26.6
Cell strengthener (cellulose acetate butyrate in 8.5 grams of styrene) _____ 1.7
$SiO_2$ (refractory filler) _____ 107.5
Tungsten carbide (refractory filler) _____ 62.0
Blowing agent and flux ($NaHCO_3$) _____ 21.0

The foamable mixture comprised:

Foamable mixture: Grams
- Base composition --- 304.8
- Added styrene --- 3.0
- Cobalt octoate --- 0.51
- Maleic anhydride --- 3.0
- Dicyandiamide --- 7.5

Final additives:
- Water --- 6.0
- Methyl ethyl ketone peroxide --- 0.6

The mixture foamed and gelled in 9 minutes. This material could be fired first to char the organic material and subsequently to burn out the organic material, leaving an inorganic foamed product.

EXAMPLE XVI

In this example, tungsten carbide is employed as the refractory filler material. The formulation of the base mixture is as follows:

Base mixture: Grams
- Interpolymerizable mixture (same as Example A) --- 84.5
- Surfactant (Tween 20) --- 0.42
- Cell strengthener (cellulose acetate butyrate in 8.5 grams of styrene --- 1.7
- Added styrene --- 26.6
- Refractory filler (tungsten carbide powder) --- 169.5
- Blowing agent and flux ($Na_2CO_3$) --- 21.0

The foamable mixture comprised:

Foamable mixture: Grams
- Base mixture (same as above) --- 304.0
- Cobalt octoate --- 0.5
- Maleic anhydride --- 3.0
- Dicyandiamide --- 7.5

Final additive:
- Water --- 6.0
- Methyl ethyl ketone peroxide --- 0.6

The mixture foamed and gelled in 3 minutes to provide a cellulated body which could be further fired first to char the organic foamed binder and then to burn out the charred material, leaving a cellular inorganic structure in accordance with the provisions of this invention.

EXAMPLE XVII

In this example, a mixture of a number of different highly melting oxides of metals was employed as a filler material. The base composition comprised:

Base mixture: Grams
- Interpolymerizable mixture (same as Example A) --- 200.0
- Surfactant (Tween 20) --- 1.0
- Cell strengthener (cellulose acetate butyrate in 20 grams of styrene) --- 4.0
- Added styrene --- 80.0
- $SiO_2$ --- 221.0
- $Al_2O_3$ (anhydrous) --- 192.0
- $TiO_2$ --- 6.5
- Calcium oxide --- 75.0
- $Fe_2O_3$ --- 3.0
- MgO --- 1.0
- Blowing agent and flux ($NaHCO_3$) --- 20.0

The foamable mixture comprised:

Foamable mixture: Grams
- Base composition --- 300.0
- Cobalt octoate --- 0.51
- Added styrene --- 5.0
- Maleic anhydride --- 3.0
- Dicyandiamide --- 7.50

Final additives:
- Water --- 6.0

The resultant mixture exothermed to provide a foamed gel, which was further fired at 1800° F. to provide an inorganic foam structure comprising filler material bonded together by an intermediate glass phase.

EXAMPLE XVIII

In this example, a mixture of antimony trioxide and silica was employed as a refractory filler material. The base composition comprised:

Base mixture: Grams
- Interpolymerizable mixture (same as Example B) --- 79.6
- Interpolymerizable mixture (same as Example A) --- 16.5
- Surfactant (Tween 20) --- 0.48
- Flame retardant (tris-dichloropropyl) phosphate --- 10.0
- Cell strengthening agent (cellulose acetate butyrate in 8.5 grams of styrene) --- 1.70
- Antimony trioxide --- 8.5
- $SiO_2$ --- 158.7
- Blowing agent and flux ($NaHCO_3$) --- 30.0

The foamable mixture comprised:

Foamable mixture: Grams
- Base mixture --- 305.0
- Added styrene --- 5.0
- Cobalt octoate --- 0.51
- Maleic anhydride --- 3.0
- Dicyandiamide --- 7.5

Final additives:
- Water --- 6.0
- Methyl ethyl ketone peroxide --- 0.6

The final mixture was poured into a mold where it foamed and set in 18 minutes, and was a firm gel in 22 minutes.

EXAMPLE XIX

This example substantially corresponds to Example XVIII, except that tris-(dichloropropyl)phosphate as the flame retardant agent for the interpolymer resin component is replaced by a like amount of tris-(chlorobromopropyl)phosphate. The results substantially corresponded to those obtained in Example XVIII.

EXAMPLE XX

In this example, pulverulent crystalline silica was employed as a refractory filler material. The base composition comprised:

Base mixture: Grams
- Interpolymerizable mixture (same as Example A) --- 125.0
- Surfactant (Tween 20) --- 0.6
- Cell strengthening agent (cellulose acetate butyrate) --- 2.5
- Added styrene --- 51.7
- $SiO_2$ (crystalline type) --- 249.5
- Blowing agent and flux (sodium bicarbonate—$NaHCO_3$) --- 62.5

The foamable mixture comprised:

Foamable mixture: Grams
- Base mixture (same as above) --- 400.0
- Cobalt octoate --- 0.68
- Styrene --- 4.0
- Maleic anhydride --- 4.0
- Dicyandiamide --- 10.0

Final additives:
- Water --- 8.0
- Methyl ethyl ketone peroxide --- 0.8

The mixture was poured into a mold and foamed and set within a period of 21 to 22 minutes. The foamed material had a density of 29.8 pounds per cubic foot. The foam was subjected to a temperature extending up to 1600° F. over a period of 2 hours and 35 minutes to provide a coherent, charred, foamed material. The material was then further fired up to a temperature of 1800° F. over a total period of approximately 14 hours. The fired material was an inorganic foam and was very strong.

EXAMPLE XXI

In this example, titanium dioxide was employed as the refractory filler material. The base mixture in this instance was of the following composition:

Base mixture: Grams
   Interpolymerizable mixture (same as Example A) _____ 125.0
   Surfactant (Tween 20) _____ 0.6
   Cell strengthening agent (cellulose acetate butyrate) _____ 2.5
   Added styrene _____ 56.7
   Titanium dioxide _____ 249.5
   Blowing agent and flux (NaHCO$_3$) _____ 62.5

The foamable mixture comprised:

Foamable mixture: Grams
   Base mixture _____ 400.0
   Cobalt octoate _____ 0.68
   Added styrene _____ 6.0
   Maleic anhydride _____ 4.0
   Dicyandiamide _____ 10.0
Final additives:
   Water _____ 8.0
   Methyl ethyl ketone peroxide _____ 0.8

The resultant mixture foamed gently and gelled in a period of 6 minutes. The resultant foam had a density of 48.3 pounds per cubic foot. The foam was fired in an oven first to a temperature of 1100° F. and then to 1640° F., over a period of 1 hour and 33 minutes. Subsequently, it was fired to a temperature of 1800° F. over a period extending up to approximately 15 hours. The resultant sample was hard and strong, and had a density of 40.0 pounds per cubic foot.

EXAMPLE XXII

The base mixture of this example was of the following composition:

Base mixture: Grams
   Interpolymerizable mixture (same as Example A) _____ 1050.0
   Emulsifier (Tween 20) _____ 5.1
   Fumaric acid _____ 3.0
   Styrene _____ 535.0
   Cell strengthener (cellulose acetate butyrate dissolved in the styrene) _____ 21.0
   SiO$_2$ (refractory filler) _____ 2199.0
   Blowing agent and flux (NaHCO$_3$) _____ 420.0

The foamable mixture comprised:

Foamable mixture: Grams
   Base mixture _____ 3000.0
   Cobalt octoate _____ 5.0
   Maleic anhydride _____ 30.0
   Dicyandiamide _____ 75.0
Final additives:
   Water _____ 60.0
   Methyl ethyl ketone peroxide _____ 6.0

The mixture was poured into a mold and foamed and gelled in 22 minutes. The foamed mixture of interpolymer resin and inorganic refractory filler material was placed in an oven and was fired up to a temperature of 1200° F. over a period of 3 hours and 10 minutes. The latter temperature was held for 3 to 3½ hours. The crust was removed from the resultant char and it was found that the latter was found and uncracked. This char could be used as an insulative material at relatively high temperatures. The physical properties of the foam were as follows:

|  | Fired | Unfired |
|---|---|---|
| Ultimate compression strength, pounds per square inch | 368 | 535 |
| Compressive yields, pounds per square inch | 235 | 440 |
| Flexural strength, pounds per square inch | | 265 |
| Modulus | | 1.66×10$^5$ |
| Flexural strength, pounds per square inch | | 643 |

EXAMPLE XXIII

The base mixture in this example comprised:

Base mixture: Grams
   Interpolymerizable mixture (same as Example A) _____ 1050.0
   Emulsifier (Tween 20) _____ 5.1
   Fumaric acid _____ 3.0
   Styrene _____ 535.0
   Cell strengthener (cellulose acetate butyrate dissolved in the styrene) _____ 21.0
   Refractory filler (SiO$_2$) _____ 2199.0
   Blowing agent and flux (NaHCO$_3$) _____ 420.0

The foamable mixture comprised:

Foamable mixture: Grams
   Base mixture _____ 1200.0
   Cobalt octoate _____ 1.9
   Maleic anhydride _____ 12.0
   Dicyandiamide _____ 30.0
Final additives:
   Water _____ 24.0
   Methyl ethyl ketone peroxide _____ 2.4

The mixture was introduced into a mold. The mixture foamed and gelled to provide a product, before firing of a density of 27.8 pounds per cubic foot. The resultant foam was fired at a temperature up to 1800° F. over a period of 11 hours and 15 minutes. The fired product was an inorganic foam of sound structure and a density of 27.0 pounds per cubic foot. The characteristics of the foam were as follows:

|  | Unfired | Fired |
|---|---|---|
| Modulus | 3.47×10$^4$ | 6.5×10$^3$ |
| Flexural strength, pounds per square inch | 276 | 183 |
| Ultimate compressive strengths, pounds per square inch | 538 | 135 |
| Compressive yields, pounds, per square inch | 440.7 | 132 |

EXAMPLE XXIV

The interpolymerizable component of this foam was a mixture of two interpolymerizable compositions, which respectively, were the same as Examples C and A. The base mixture comprised:

Base mixture: Grams
   Interpolymerizable mixture (same as Example C) _____ 434.0
   Interpolymerizable mixture (same as Example A) _____ 150.5
   Surfactant (Tween 20) _____ 3.1
   Styrene _____ 115.0
   Cell strengthener (cellulose acetate butyrate dissolved in the styrene) _____ 10.2
   Asbestos fibers _____ 58.5
   Refractory filler (SiO$_2$) _____ 783.0
   Blowing agent and flux (NaHCO$_3$) _____ 150.0

The foamable mixture comprised:

Foamable mixture: Grams
   Base mixture (as above) _____ 1700.0
   Cobalt octoate _____ 3.4
   Maleic anhydride _____ 14.3
   Dicyandiamide _____ 41.0

To the foregoing mixture the final additives were then added as follows:

Final additives: Grams
- Water _____ 24.0
- Methyl ethyl ketone peroxide _____ 4.4

One portion of the mixture was poured into a mold and foamed and gelled in about 18 minutes. The density of the foam was 27 pounds per cubic foot. The foam had a good cell structure and a good surface. The foamed product was then fired at a temperature up to about 1720° F. over a total period of 7 hours and 45 minutes. The resultant product was a very strong, cellular product having no visible internal cracking. The compressive strength thereof was 868 pounds per square inch.

A second portion of the mixture was poured into a mold and foamed, and was then fired at a temperature up to 1200° F. in order to char the same, firing being continued for 9 hours and 40 minutes. The charred specimen, when removed from the furnace, was still of good structure and was not warped, and there were no internal cracks. The volume was 76.6 percent of the original volume and the density was 24.7 pounds per cubic foot. The closed cells were 24.4 percent of the total cell structure.

A further sample of the material was fired at a temperature up to 1700° F. over a period of 8 hours and 15 minutes. The resultant foamed product was sintered, but there was no apparent cracking. The properties of the foam were as follows:

- Modulus _____ $5.64 \times 10^5$.
- Flexural strength _____ 489 pounds per square inch.
- Tensile strength _____ 159 pounds per square inch.

A still further sample was fired at a temperature of 1600° F. for a total time of 11 hours and 40 minutes, and gave the following test properties:

- Density _____ 29.0 pounds per cubic foot.
- Flexural strength _____ 311 pounds per square inch.
- Modulus _____ $1.09 \times 10^5$.
- Closed cells _____ 34.2 percent.

EXAMPLE XXV

In this example, a mixture of zirconium dioxide and calcium carbonate was employed as the refractory filler material. The base mixture comprised:

Base mixture: Grams
- Interpolymerizable mixture (same as Example A) _____ 84.0
- Surfactant (Tween 20) _____ 0.42
- Cell strengthener (cellulose acetate butyrate dissolved in the styrene) _____ 1.7
- Styrene _____ 28.5
- $ZrO_2$ (refractory filler) _____ 170.0
- $CaCO_3$ (refractory filler) _____ 8.5
- Blowing agent and flux ($NaHCO_3$) _____ 21.0

The foamable mixture comprised:

Foamable mixture: Grams
- Base mixture _____ 300.0
- Cobalt octoate _____ 0.5
- Maleic anhydride _____ 3.0
- Dicyandiamide _____ 7.5

The final additives were:

Final additives: Grams
- Water _____ 6.0
- Methyl ethyl ketone peroxide _____ 0.6

The mixture foamed and gelled in 9 minutes. The foam had a density of 36.9 pounds per cubic foot. The foamed product was fired at a temperature up to 1800° F. over a period of 6 hours and 50 minutes. The product was a cellular, inorganic foam.

EXAMPLE XXVI

The base mixture in this example is of the following composition:

Base mixture: Grams
- Polyester resin (same as Example A) ____ 1061.0
- Polyester resin (same as Example B) ____ 200.0
- Surfactant (polyosyethylene sorbitan monolaurate) _____ 8.0
- Styrene _____ 150.0
- Cell strengthener (cellulose acetate butyrate dissolved in the above styrene) _____ 19.3
- $Al_2O_3$ _____ 2060.0
- $CaCO_3$ _____ 100.0
- $NaHCO_3$ _____ 31.5

The above mixture was stirred until homogeneous and then there was added:

Foamable: Grams
- Base mixture _____ 1200.0
- Benzoyl peroxide/styrene paste 50/50 ____ 5.2
- Maleic anhydride _____ 14.0

The above was stirred to a uniform consistency and then there was admixed:

Final additives: Grams
- Water _____ 23.0
- Diethylaniline _____ .93

The resultant mixture was poured into a mold (9" x 5" x 4") and allowed to foam. The resultant foam completely filled the mold and gelled in about 18–20 minutes. The resultant organic foam had a density of 30.7 pounds per cubic foot.

The foamed sample was then fired in a moving bed tunnel kiln of the type used in the ceramics industry. The tunnel kiln was 63 feet long, having a zone of maximum temperature near the center and having an entrance temperature between 300° F. and 500° F. and an exit temperature of essentially room temperature. The sample was exposed to a maximum temperature of 2850° F. for about 100 minutes.

A strong inorganic foam having a density of 23.0 pounds per cubic foot was attained.

EXAMPLE XXVII

In accordance with the provisions of this example, a foamed material was prepared wherein the refractory filler material was a mixture of pulverulent silica and vanadium pentoxide ($V_2O_5$). The resultant foamed product was fired. This foam can be used as a catalyst for high temperature reactions, such as the conversion of naphthalene to phthalic anhydride. The base mixture comprised:

Base mixture: Grams
- Polyester-monomer mixture (as per Example A) _____ 235.5
- Polyester-monomer mixture (as per Example C) _____ 368.0
- Emulsifier [1] (Tween 20) _____ 3.0
- Styrene (added monomer) _____ 118.0
- Cellulose acetate butyrate _____ 10.2
- Pulverulent silica _____ 404.0
- Pulverulent vanadium pentoxide _____ 461.0
- Sodium bicarbonate _____ 85.5
- Asbestos fibers _____ 34.1

[1] Polyoxyethylene sorbitan monolaurate.

These materials were stirred together to provide a uniform paste and were then further compounded as follows:

Foamable mixture: Grams
- Above resin mixture _____ 1700.0
- Cobalt octoate _____ 2.9
- Maleic anhydride _____ 25.8
- Dicyandiamide _____ 41.8

The total of these ingredients was stirred until a uniform paste was obtained, and there was further added:

Final additives: Grams
    Water (with 2 minutes stirring) _____ 25.8
    Methyl ethyl ketone peroxide (with 1 minute stirring) _____ 4.0

The mixture was troweled into a mold 10½ inches square by 1 inch deep. The mixture foamed gently and gelled in 3 to 5 minutes. The resultant foamed mixture cured to a hard resinous state and could be used as a heat insulating medium with the organic binder still intact. It could also be subjected to charring to a temperature in a range of 800° F. to 1200° F. The organic material could be burned out to provide a catalyst body.

In a specific instance, the foamed product was fired at 1800° F. for 5 hours in an electrically heated furnace, thus providing a strong, inorganic foam. The properties of the final state product were:

Density, pounds per cubic foot _____ 38.1
Percent closed cells _____ 33.8
Water vapor transmission in perms (after three days aging) [1] _____ 53.78
Water vapor transmission in perms (after 7 days aging) [1] _____ 47.66

[1] Perms are defined in ASTM E96–53T.

EXAMPLE XXVIII

In this example, alumina was employed as the refractory filler, a carbonaceous fiber was employed as the fibrous material and sodium bicarbonate served as a flux and blowing agent.

Base mixture: Grams
    Polyester resin (same as Example A) _____ 135.0
    Polyester resin (same as Example C) _____ 75.0
    Surfactant (polyoxyethylene sorbitan monolaurate) _____ 1.3
    Styrene _____ 25.0
    Cell strengthener (cellulose acetate butyrate dissolved in above styrene) _____ 3.2
    Fibrous material (carbonaceous fiber) _____ 3.6
    Refractory filler ($Al_2O_3$) _____ 343.2
    Blowing agent and flux (sodium bicarbonate) _____ 7.1

The base mixture is mixed until a uniform paste is obtained. The foamable mixture comprised:

Foamable mixture: Grams
    Base mixture _____ 570.0
    Cobalt octoate _____ 1.5
    Maleic anhydride _____ 5.7
    Dicyandiamide _____ 10.0

The foamable mixture is mixed until a uniform paste is obtained.

Final additives: Grams
    Water _____ 10.0
    Methyl ethyl ketone peroxide _____ 1.5

The resultant mixture was poured into a mold where it slowly foamed and gelled in about 30 minutes. The filled organic foam had a density of 34 pounds per cubic foot. The foamed sample was then fired in a 63-foot long moving bed tunnel kiln having a zone of maximum temperature near the center and having an entrance temperature between 300° F.–500° F. and an exit temperature of essentially room temperature. The sample was exposed to a maximum temperature of 2850° F. for 66 minutes.

A strong inorganic foam having no external cracks was obtained. The foam had a density of 26.0 pounds per cubic foot. The volume shrinkage during the firing was 27.1 percent.

EXAMPLE XXIX

In this example, zirconia was employed as the refractory filler, asbestos was employed as the fibrous material and ammonium bicarbonate served as the blowing agent.

Base mixture: Grams
    Polyester resin (same as Example A) _____ 155.0
    Polyester resin (same as Example B) _____ 55.0
    Surfactant (polyoxyethylene sorbitan monolaurate) _____ 1.3
    Styrene _____ 25.0
    Cell strengthener (cellulose acetate butyrate dissolved in above styrene) _____ 3.2
    Fibrous material (asbestos) _____ 18.4
    Refractory filler ($ZrO_2$) _____ 341.5

The foamable mixture comprised:

Foamable mixture: Grams
    Base mixture _____ 572.0
    Cobalt octoate _____ 1.5
    Ammonium bicarbonate _____ 19.0
Final additives:
    Water _____ 10.0
    Methyl ethyl ketone peroxide _____ 1.5

The resultant mixture was poured into a mold where it slowly foamed and gelled in about 20 minutes. The filled organic foam had a density of 41.6 pounds per cubic foot. The foamed sample was then fired in the tunnel kiln described in Example XXVIII. The sample was exposed to a maximum temperature of 2800° F. for 100 minutes.

A strong, inorganic foam retaining most of the original cell structure and shape and having only slight distortion was obtained having a density of 53.3 pounds per cubic foot. The volume shrinkage during firing was 53.6 percent.

EXAMPLE XXX

In this example, a mixture of alumina and zirconia was employed as the refractory filler, an aluminum silicate fiber was employed as the fibrous material and ammonium bicarbonate was employed as the blowing agent Base mixture: Grams
    Polyester resin (same as Example A) _____ 155.0
    Polyester resin (same as Example C) _____ 55.0
    Surfactant (polyoxyethylene sorbitan monolaurate) _____ 1.3
    Styrene _____ 25.0
    Cell strengthener (cellulose acetate butyrate dissolved in above styrene) _____ 3.2
    Fibrous material (aluminum silicate fibers) __ 10.9
    Refractory fillers ($Al_2O_3$) _____ 175.0
    $ZrO_2$ (5 percent CaO stabilized) _____ 175.0

The foamable mixture comprised:

Foamable mixture: Grams
    Base mixture _____ 572.0
    Cobalt octoate _____ 1.5
    Ammonium bicarbonate _____ 19.0

Final additives: Grams
    Water _____ 10.0
    Methyl ethyl ketone peroxide _____ 1.5

The resultant mixture was poured into a mold where it slowly foamed and gelled in about 25 minutes. The resulting organic foam had a density of 34.6 pounds per cubic foot. The foamed sample was then fired in a tunnel kiln as described in Example XXVIII, being exposed to a maximum temperature of 2800° F. for 100 minutes. A strong inorganic foam having a density of 29.4 pounds per cubic foot was obtained. The volume shrinkage of the sample was 28.9 percent.

EXAMPLE XXXI

In this example, a mixture of stabilized zirconia and silica was employed as the refractory filler, asbestos was employed as the fibrous material and ammonium carbonate was employed as a blowing agent.

Base mixture: Grams
- Polyester resin (same as Example A) _____ 150.0
- Polyester resin (same as Example C) _____ 60.0
- Surfactant (polyoxyethylene sorbitan monolaurate) _____ 1.3
- Styrene _____ 25.0
- Cell strengthener (cellulose acetate butyrate dissolved in above styrene) _____ 3.2
- Fibrous material (asbestos) _____ 18.4
- Refractory filler ($SiO_2$) _____ 85.5
- $ZrO_2$ (5 percent CaO stabilized) _____ 256.0

The foamable mixture comprised:

Foamable mixture: Grams
- Base mixture _____ 572.0
- Cobalt octoate _____ 1.5
- $NH_4HCO_3$ _____ 19.0

Final additives: Grams
- Water _____ 10.0
- Methyl ethyl ketone peroxide _____ 1.5

The resultant mixture was poured into a mold where it slowly foamed and gelled in about 15 minutes. The resultant foam had a density of 40.7 pounds per cubic foot. The foamed sample was then fired as in Example I, being exposed to a maximum temperature of 2800° F. for 100 minutes. A strong inorganic foam having a density of 48.6 pounds per cubic foot was obtained.

EXAMPLE XXXII

In this example, stabilized zirconia was employed as the refractory filler, an aluminum silicate fiber was employed as the fibrous material and sodium bicarbonate was employed as a blowing agent and flux.

Base mixture: Grams
- Polyester resin (same as Example A) _____ 100.0
- Polyester resin (same as Example B) _____ 31.0
- Surfactant (polyoxyethylene sorbitan monolaurate) _____ 0.9
- Styrene _____ 40.0
- Cell strengthener (cellulose acetate butyrate dissolved in above styrene) _____ 2.6
- Fibrous material (aluminum silicate fiber) _____ 15.0
- Refractory filler ($ZrO_2$—5 percent CaO stabilized) _____ 286.5
- Blowing agent and flux (sodium bicarbonate) _____ 24.5

The foamable mixture comprised:

Foamable mixture: Grams
- Base mixture _____ 500.0
- Cobalt octoate _____ 1.0
- Maleic anhydride _____ 5.0
- Dicyandiamide _____ 12.5

Final additives: Grams
- Water _____ 8.3
- Methyl ethyl ketone peroxide _____ 1.2

The resultant mixture was poured into a mold where it foamed and gelled in about 15 minutes. The resultant foam had a density of 39.0 pounds per cubic foot. The foamed sample was then fired in a gas-air fired kiln. The sample was placed in the kiln having an initial temperature of 500° F. The main torches were then lighted. The kiln heated to 1900° F. in about 1 hour. Some conflagration of the organic binder occurred. At the end of 6 hours, the kiln temperature reached 2600° F., at the end of 8 hours 2700° F., and at the end of 9 hours 2800° F. The heat was then shut off and the furnace allowed to cool.

A strong inorganic foam was obtained having a density of 47.3 pounds per cubic foot.

EXAMPLE XXXIII

In this example, alumina was employed as the refractory filler, asbestos was employed as the fibrous material and sodium bicarbonate was employed as the blowing agent and flux.

Base mixture: Grams
- Polyester resin (same as Example A) _____ 100.0
- Polyester resin (same as Example B) _____ 100.0
- Surfactant (polyoxyethylene sorbitan monolaurate) _____ 1.3
- Styrene _____ 35.0
- Cell strengthener (cellulose acetate butyrate dissolved in above styrene) _____ 3.2
- Fibrous material (asbestos) _____ 10.9
- Refractory filler ($Al_2O_3$) _____ 343.0
- Blowing agent and flux (sodium bicarbonate) _____ 7.1

The foamable mixture comprised:

Foamable mixture: Grams
- Base mixture _____ 547.0
- Cobalt octoate _____ 1.2
- Maleic anhydride _____ 5.5
- Dicyandiamide _____ 9.7

Final additives: Grams
- Water _____ 10.0
- Methyl ethyl ketone peroxide _____ 1.5

The resultant mixture was poured into a mold where it slowly foamed and gelled in about 30 minutes. The resultant foam had a density of 43.2 pounds per cubic foot and contained large non-uniform cells. The foamed sample was then fired in the 63-foot long tunnel kiln as described in Example XXVIII. The sample was exposed to a maximum temperature of 2800° F. for 100 minutes. A strong inorganic foam retaining almost all of the original cell structure and having only slight distortion was obtained having a density of 37.5 pounds per cubic foot. The volume shrinkage of the sample was 33.9 percent.

EXAMPLE XXXIV

This example is illustrative of the use of a number of different fluxing agents in combination with silica as the refractory filler in the foamable compositions.

Test A

In this test, the fluxing agent was calcium carbonate. The polyester component corresponded to that of Example A. The base composition comprised:

Base mixture: Grams
- Polyester (as per Example A) _____ 76.3
- Emulsifier (Tween 20) _____ 0.5
- Styrene _____ 36.0
- Cellulose acetate butyrate _____ 1.6
- Silica _____ 160.0
- Calcium carbonate (fluxing agent) _____ 31.0

These components were stirred together to provide a paste and the mixture was further formulated as follows:

Grams
- Mixture (same as above) _____ 300.0
- Cobalt octoate _____ 0.5
- Maleic anhydride _____ 3.0
- Ammonium bicarbonate (blowing agent) _____ 10.0

The mixture was stirred until uniform, and 4 milliliters of water were stirred in and the mixture was then catalyzed with 0.8 gram of methyl ethyl ketone peroxide. The mixture was introduced into molds 5 inches square, and it then foamed and gelled over a period of 13 minutes.

The organic foam was heated in an electric oven at a temperature rising from that of the room to 1800° F. over a period of 9 to 10 hours. The foam was strong and coherent. All or most of the carbonaceous material was removed.

Test B

In this test, the fluxing agent comprised 31 grams of calcium chloride, replacing the calcium carbonate, and the styrene content was reduced to 31 grams. The formulation was in other respects substantially the same as that of Test A. The mixture foamed and gelled in about 30 minutes. The organic foam was fired in the same way as that of Test A, with like results.

Test C

In this test, the fluxing agent was barium chloride, replacing calcium chloride. The composition was in other respects essentially the same as that of Test B. The mixture foamed and gelled in 12 minutes.

The foam was heated as in Test A, with like results.

Test D

In accordance with this test, the fluxing agent in the base composition was sodium acetate. The base composition could be formulated into a foamable mixture as in Test A. Firing under the schedule of Test A gave similar results.

Test E

In accordance with this test, borax decahydrate $$(N_2B_4O_7 \cdot 10H_2O)$$

was employed as the fluxing agent. In other respects, the composition substantially corresponded to that of Test A. Firing under the schedule of Test A gave similar results.

Test F

In accordance with this test, the fluxing agent was potassium bicarbonate (31 grams). The base composition in other respects substantially corresponded to that of the base composition in Test B. A foamable composition was prepared from the base composition by forming a mixture comprising:

|  | Grams |
|---|---|
| Base composition | 300.0 |
| Cobalt octoate | 0.5 |
| Maleic anhydride | 3.0 |
| Dicyandiamide | 7.5 |

To this mixture was then added 6 milliliters of water and 0.6 gram of methyl ethyl ketone peroxide. This mixture was poured into molds and foamed gently and gelled in about 18 minutes.

EXAMPLE XXXV

In accordance with the provisions of this example, the minimum ratio of the fluxing agent with respect to the refractory filler material was investigated. A series of samples was prepared wherein the base compositions for each of the formulations comprised:

| Base mixture: | Grams |
|---|---|
| Polyester resin mixture (as per Example A) | 84.0 |
| Polyester resin mixture (as per Example C) | 17.9 |
| Surfactant (Tween 20) | 0.5 |
| Styrene | 27.4 |
| Cellulose acetate butyrate | 1.7 |
| Asbestos fibers | 7.5 |

In the base compositions, the refractory filler material was pulverulent silica, and the fluxing and blowing agent was sodium bicarbonate. In each instance, the total of the silica and the fluxing agent was 161 grams. The ratio of silica and sodium bicarbonate fluxing agent was varied in steps from 14 percent to 2 percent of the fluxing agent, the silica being varied accordingly to provide a total of 161 grams. In each instance, the base mixture was made up into a foamable mixture comprising:

|  | Grams |
|---|---|
| Base mixture | 300.0 |
| Cobalt octoate | 0.6 |
| Maleic anhydride | 3.0 |
| Dicyandiamide | 7.5 |

To this mixture were further added 5 milliliters of water and 0.6 gram of catalyst (methyl ethyl ketone peroxide). The resultant mixtures were allowed to foam and cure in a suitable mold, and the cured foamed products were subsequently fired at 1800° F. until the organic material was substantially completely removed and an inorganic refractory foamed product was obtained. The products in each instance were relatively coherent and strong. Apparently, the particles of silica were coated with and bonded together by films of glass.

Apparently, higher and lower ratios of fluxing agent would be permissible in those instances in which the maximum characteristics of the foamed product were not required.

EXAMPLE XXXVI

Test A

In this test, the refractory filler material comprised thorium dioxide and borax. The base composition comprised:

| Base mixture: | Grams |
|---|---|
| Polyester resin (as per Example A) | 84.0 |
| Surfactant (Tween 20) | 0.5 |
| Styrene | 34.0 |
| Cellulose acetate butyrate | 1.7 |
| Thorium dioxide | 169.5 |
| Borax | 50.0 |
| Sodium bicarbonate | 21.0 |

These ingredients were mixed together and formulated into a filled foamable composition comprising:

|  | Grams |
|---|---|
| Base composition | 360.0 |
| Cobalt octoate | 0.5 |
| Maleic anhydride | 3.0 |
| Dicyandiamide | 7.5 |

To these were added 6 milliliters of water and 0.6 gram of methyl ethyl ketone peroxide. The mixture foamed and gelled in about 3 to 4 minutes. The borax apparently acted to speed up the gel time.

The resultant organic foam was fired at a temperature up to 1800° F. in an electrical furnace over a period of about 11 hours. The resultant product was an inorganic sintered foam. The foam was exposed to the flame of an oxyacetylene torch for several minutes and withstood the action of the latter successfully.

Test B

In this test the base composition comprised:

| Base mixture: | Grams |
|---|---|
| Polyester resin (as per Example C) | 111.0 |
| Surfactant (Tween 20) | 0.6 |
| Tris-(dichloropropyl)phosphate | 14.0 |
| Styrene | 13.7 |
| Cellulose acetate butyrate | 2.2 |
| Antimony trioxide | 9.7 |
| Asbestos fibers | 8.7 |
| Thorium dioxide | 127.0 |
| Sodium bicarbonate | 24.3 |

The resultant base mixture was formulated into a foamable composition comprising:

| | Grams |
|---|---|
| Base mixture | 190.0 |
| Added styrene | 3.0 |
| Cobalt octoate | 0.3 |
| Maleic anhydride | 0.3 |
| Dicyandiamide | 1.8 |

To these were added 1 milliliter of water and 0.6 gram of methyl ethyl ketone peroxide. The mixture foamed and gelled in about 12 minutes to provide a foam of a density of 91.2 pounds per cubic foot. This foamed material was a good ablation agent.

EXAMPLE XXXVII

This example is illustrative of the preparation and testing of a foamed composition, comparison of the thermal conductivity thereof being effected against a so-called foam cell, which is a form of fused and foamed silica. The base composition in this example comprised:

Base mixture:

| | Grams |
|---|---|
| Polyester resin (as per Example A) | 394.0 |
| Polyester resin (as per Example C) | 206.0 |
| Surfactant (Tween 20) | 2.8 |
| Styrene | 117.0 |
| Cellulose acetate butyrate | 10.1 |
| Asbestos fibers | 34.0 |
| Silica | 803.0 |
| Sodium bicarbonate | 135.0 |

These ingredients were stirred and were then formulated into a foamable composition comprising:

| | Grams |
|---|---|
| Base composition | 1700.0 |
| Cobalt octoate | 3.2 |
| Maleic anhydride | 17.0 |
| Dicyandiamide | 42.5 |

The foamable composition was stirred until uniform and thereto were added 25 milliliters of water and 4 grams of methyl ethyl ketone peroxide. The mixture was poured into a mold and set in about 18 minutes. The foamed gel was obtained in about 25 minutes. The resultant organic foam was then heated in a furnace at about 1800° F. for 11 hours and 20 minutes.

For purposes of comparing the thermal conductivity of the foregoing material with that of a foamed fused silica as previously described, 1-inch cubes of each of the materials were prepared and inserted into openings in the hot side of the furnace door in proximity to each other. Each sample was provided upon its outer face with a thermocouple connection, and the edges about the samples were sealed with a refractory cement in order to prevent convectional heating of the back of the samples. The temperature within the furnace was first raised to 1200° F. over a period of 1½ hours and was maintained at the foregoing temperature for an additional 1 hour. The temperatures of the cold sides of the samples were recorded during the heating period. The maximum temperatures attained on the cold sides of the samples were as follows:

| | ° F. |
|---|---|
| Applicants' product | 468 |
| Foamed silica | 482 |

It was thus apparent that the applicants' material under high temperature conditions was slightly better than the foamed silica obtained by conventional methods.

The furnace was then cooled and was heated to 1800° F. over a period of 1½ to 2 hours, and was maintained at the latter temperature for a further period of one hour. The maximum temperatures of the cold sides of the two samples are tabulated as follows:

| | ° F. |
|---|---|
| Applicants' material | 730 |
| Foamed silica | 750 |

It is again apparent that at 1800° F. applicants' material is superior in resistance to heat transmission to the foamed silica.

The inorganic foams of this invention, although cellular in nature, are very strong mechanically and have a high resistance to heat transmission. Some have been found to have such high heat resistance that they can withstand temperatures of 5000° F. or even 10,000° F. for a considerable period of time.

The foamed bodies in either the unfired state or the fired inorganic state may be cut by grinding or other means to provide regular and/or accurately formed shapes suitable for uses wherein accuracy as to size or shape of the parts is required.

Blocks or slabs of the inorganic foams of this invention may be laid up in the conventional manner to provide a wall or a coating for a wall or other assemblage to provide high heat resistance; likewise, blocks or slabs of the foams disclosed herein may be placed between two panels, such as between the interior and exterior walls of a vault or safe to provide an assemblage which has high heat resistance and low thermal conductivity.

Not only may the foams of this invention be molded in the form of bricks or slabs, but if desired, the foam of this invention may be molded or shaped into more intricate bodies such as hollow cylinders or cones. One important utility for hollow cylindrical or ellipsoidal bodies is as a liner for mufflers or pipes through which pass hot gases. Molded conical shapes may be machines to serve as nose cones on ballistic missiles.

If desired, the inorganic foams of sintered refractory material and fluxing agent, containing little or no organic material, may be post-impregnated with thermosetting resin components or with a fused or dissolved resin in order to fill or partially fill the open cells thereof to impart ablation properties. After the organic matter is ablated away, the original inorganic foam remains to provide insulation at high temperatures. Appropriate impregnating resins may comprise phenol-formaldehyde resins, epoxy resins and resins which are interpolymers of a monomer, such as styrene, and a polyester of a glycol and an anhydride of an alpha, beta-ethylenic dicarboxylic acid.

The resins or their components in the liquid stage may be caused more fully to fill the cells of the inorganic foam by application of fluctuating pressures, for example, by subjecting the foam while partially or completely immersed in resin or mixture, alternately to vacuum and atmospheric or superatmospheric pressure. Resin may also be allowed to immerse an inorganic foam which is under vacuum. The resin can readily flow into the evacuated cells and the tendency will be increased when the vacuum is released.

For a better understanding of the invention, reference may now be had to the drawings. FIG. 1 is an isometric view of a slab or block of a heat resistant foam formed in accordance with the provisions of this invention. In the unfired state where 10 represents the cells of the foamed material, 11 represents the thermosetting polyester resin binder containing dispersed therein the refractory filler and the fibrous material, if present. After the foam has been fired in accordance with the method of this invention, referring again to FIG. 1, 10 represents the cells of the foam and 11 represents septa comprising sintered particles of the refractory filler which may be interspersed therein the fibrous material which remains after the firing is complete, if initially present.

Figure 2:
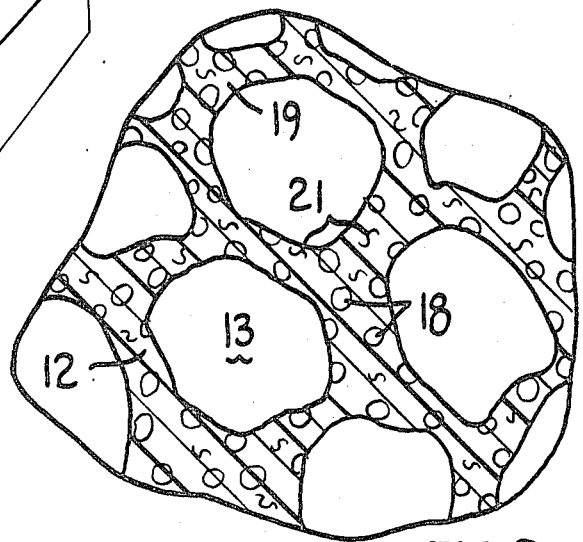
Figure 3:
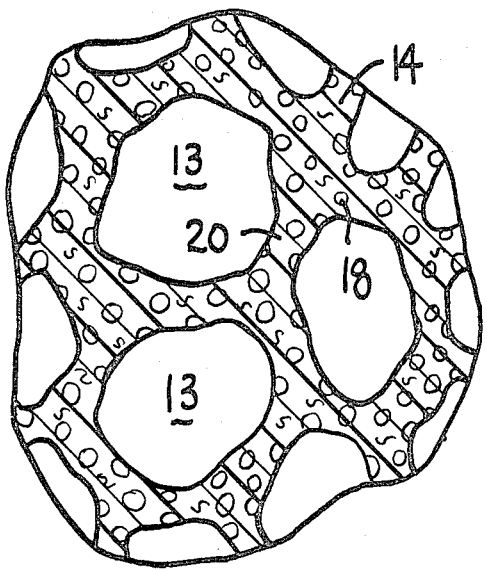

FIGS. 2 and 3 approximately illustrate the character of the cells and walls thereof. Septa 12 are disposed between cells 13 of the foamed body. The polyester resin binder 19 of the foam is indicated as being intact and the particles 18 of the refractory filler and the fibrous material 21, if present, are randomly dispersed and embedded therein.

The firing is attended by volatilization and usually some degree of combustion of the polyester resin binder. The volume filled by the organic material is thus reduced and as a result, as will be apparent by comparison of FIGS. 2 and 3, wherein 14 represents the charred polyester resin binder, there will be a shrinkage of the volume of the foamed body, whereby the particles of refractory material are allowed to approach each other.

Figure 4:
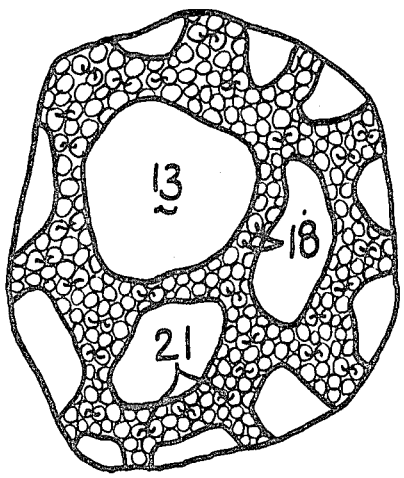

When the firing is complete, as illustrated in FIG. 4, the septa between the cells will comprise contiguous particles of refractory oxide, at least some of which sintered together at the points of contact to provide a strong, rigid, inorganic foam having dispersed through the substantial inorganic refractory septa, fibrous material which remains intact when the firing is complete.

Figure 5:
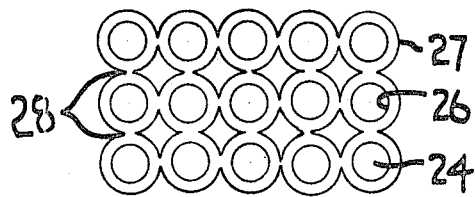

When a fluxing agent for the refractory oxide, as hereinabove described, is present in the composition of this invention, as the polyester resin binder is consumed and the refractory filler particles become continuous, there is an interaction between at least some of the filler particles and the fluxing agent. The resultant interaction is stylized in FIG. 5 where cores 24 of unchanged refractory material are encased in glass-like shells 26, thus providing composite, two-phase particles 27. The glass-like phases constituting the outer shells of the composite particles, while the latter are hot, will cohere as to points of contact 28, thus providing a second substantially continuous scaffold phase and providing a strong refractory and chemically resistant bond. These may be a tendency of the hot fluxed material to be drawn by capillarity between contiguous particles where they are in contiguity. This results in attenuation of the fluxed material over the main portions of the particles.

Where the fluxing agent is present, the resultant inorganic structure is generally a combination of refractory filler particles directly sintered together and refractory filler particles sintered together through the interaction with the fluxing agent, especially where low levels of fluxing agent are present.

The inorganic foamed material disclosed herein may also serve as catalyst carriers for high temperature reaction, either by incorporating the active catalyst, such as $V_2O_5$, as a minor portion of the refractory filler, or by post-treating the inorganic foam with a solution of the catalyst, thereby impregnating the inorganic foam with the catalyst.

While specific examples of the invention have been set forth hereinabove, it is not intended to limit the invention solely thereto, but to include all of the variations and modifications falling within the scope of the appended claims.

What is claimed is:

1. A method of forming an inorganic refractory foam which comprises heating a cured, thermosetting resin foam, said foam having been prepared by foaming and curing a mixture comprising:
    (A) a foamable, thermosetting resin which is a liquid mixture comprising a $>C=CH_2$ monomer, a polyester of an alpha, beta-ethylenically unsaturated dicarboxylic acid and a polyhydric alcohol;
    (B) a blowing agent therefor;
    (C) a pulverulent, inorganic refractory filler; and
    (D) a flux for said refractory filler which is a fusible compound of a metal selected from the first and second groups of the Periodic Table,
the cured resin providing a resin scaffolding supporting the particles of said refractory filler (C) positioned about the cells of the foam, to a temperature and for a time sufficient to substantially consume the resinous scaffolding and sinter together the refractory filler (C) to provide a rigid refractory foam.

2. The product of the process of claim 1.

3. A method as in claim 1 wherein the refractory filler (C) is a refractory inorganic oxide.

4. A method as in claim 3 wherein the foamable mixture contains an additional ingredient (E), a fibrous material capable of withstanding a temperature of about 2000° F. for a substantial period of time.

5. The method as in claim 4 wherein the $>C=CH_2$ monomer is styrene.

6. The product of the process of claim 4.

7. A method as in claim 4 wherein the pulverulent, inorganic refractory oxide (C) comprises a member selected from the group consisting of silica, alumina and zirconia, and mixtures thereof.

8. A method as in claim 7 wherein the blowing agent (B) is a system comprising a mixture of an alkali metal carbonate, an anhydride of a dicarboxylic acid, and water.

9. The product of the process of claim 8.

10. A method as in claim 4 wherein the pulverulent, inorganic refractory oxide (C) comprises a major amount of a member selected from the group consisting of alumina, zirconia, and mixtures of alumina and zirconia and in which the cured resin foam is heated to a temperature of about 2600° F. and maintained at a temperature above 2600° F. for a time sufficient to substantially consume the resinous scaffolding and sinter together the refractory oxide to provide a rigid refractory foam.

11. The product of the process of claim 10.

12. A method of forming a refractory oxide foam as in claim 3 which comprises heating a cured, thermosetting resin foam, said foam having been prepared by foaming and curing a mixture comprising:
    (A) a foamable, thermosetting resin which is a liquid mixture comprising 10 percent to 40 percent of a $>C=CH_2$ monomer and 90 percent to 60 percent of a polyester of an alpha, beta-ethylenically unsaturated dicarboxylic acid and a polyhydric alcohol;
    (B) a blowing agent therefor;
    (C) a pulverulent, inorganic refractory oxide comprising a major amount of a member selected from the group consisting of alumina, zirconia and a mixture of alumina and zirconia;
    (D) a flux for said refractory oxide which is a fusible compound of a metal selected from the first and second groups of the Periodic Table; and
    (E) a fibrous material capable of withstanding a temperature of 2000° F. for a substantial period of time;
the cured resin providing a resin scaffolding supporting the particles of said refractory oxide (C) and said fibrous material (E) positioned about the cells of the foam, the ratio of (A) to the combined weight of (C), (D) and (E) being from about 3:1 to about 1:3, to a temperature of about 2000° F., maintaining the temperature between about 2000° F. and about 4000° F. for a time sufficient to substantially consume the resin scaffolding and sinter together the refractory oxide (C) to provide a rigid refractory foam.

13. A method of foaming a carbonaceous refractory foam which comprises heating a cured, thermosetting resin foam, said foam having been prepared by foaming and curing a mixture comprising:
    (A) a foamable, thermosetting resin which is a liquid mixture comprising a $>C=CH_2$ monomer, a polyester of an alpha, beta-ethylenically unsaturated dicarboxylic acid and a polyhydric alcohol;
    (B) a blowing agent therefor;
    (C) a pulverulent, inorganic refractory filler; and
    (D) a flux for said refractory filler which is a fusible compound of a metal selected from the first and second groups of the Periodic Table;
the cured resin providing a resin scaffolding supporting the particles of said refractory filler (C), to a temperature above about 600° F. sufficient to char the resinous binder, thereby providing a rigid, carbonaceous structure supporting the particles of said refractory filler (C) and flux (D) positioned around the cells thereof.

14. The product of the process of claim 13.

15. A method as in claim 13 wherein the refractory filler (C) is a refractory inorganic oxide.

16. A method as in claim 15 wherein the foamable mixture contains an additional ingredient (E), a fibrous material capable of withstanding a temperature of about 2000° F. for a substantial period of time.

17. A method as in claim 16 wherein the $>C=CH_2$ monomer is styrene.

18. The produce of the process of claim 16.

19. A method as in claim 16 wherein the pulverulent, inorganic refractory oxide (C) comprises a member selected from the group consisting of silica, alumina and zirconia, and mixtures thereof.

20. A method as in claim 19 wherein the blowing agent (B) is a system comprising a mixture of an alkali metal carbonate, an anhydride of a dicarboxylic acid, and water.

21. The product of the process of claim 20.

22. A method of forming an inorganic refractory foam which comprises heating the product of the process of claim 13 for a time and at a temperature sufficient to substantially consume the carbonaceous scaffolding and sinter together the refractory filler (C) to provide a rigid refractory foam.

23. A method as in claim 22 wherein the refractory filler (C) is a refractory inorganic oxide.

24. A method as in claim 23 wherein the foamable mixture contains an additional ingredient (E), a fibrous material capable of withstanding a temperature of about 2000° F. for a substantial period of time.

25. A method as in claim 24 where the $>C=CH_2$ monomer is styrene.

26. A method as in claim 24 wherein the pulverulent, inorganic refractory oxide (C) comprises a member selected from the group consisting of silica, alumina and zirconia, and mixtures thereof.

27. A method as in claim 26 wherein the blowing agent (B) is a system comprising a mixture of an alkali metal carbonate, an anhydride of a dicarboxylic acid, and water.

References Cited

UNITED STATES PATENTS

| | | | |
|---|---|---|---|
| 3,121,050 | 2/1964 | Ford | 264—44UX |
| 3,124,542 | 3/1964 | Kohn | 260—2.5 |
| 3,175,918 | 3/1965 | McGahan et al. | 260—2.5X |
| 3,345,440 | 10/1967 | Googin et al. | 264—44X |

PHILIP E. ANDERSON, Primary Examiner

U.S. Cl. X.R.

260—2.5; 264—29, 44, 43